US006823920B2

(12) United States Patent
Gayoso (10) Patent No.: US 6,823,920 B2
(45) Date of Patent: Nov. 30, 2004

(54) PRINT MEDIA COATING DEVICE AND METHOD

(75) Inventor: Maximo Gayoso, Guadalajara Jalisco (MX)

(73) Assignee: Hewlett-Packard Development Company, L.P., Houston, TX (US)

( * ) Notice: Subject to any disclaimer, the term of this patent is extended or adjusted under 35 U.S.C. 154(b) by 76 days.

(21) Appl. No.: 10/280,989

(22) Filed: Oct. 25, 2002

(65) Prior Publication Data

US 2004/0079475 A1 Apr. 29, 2004

(51) Int. Cl.$^7$ ............................ B44C 1/17; B32B 31/20; B05D 5/00; B41M 3/12
(52) U.S. Cl. ...................... 156/540; 156/543; 156/555; 156/582; 156/584; 156/238; 156/247; 156/289; 427/209; 427/148; 128/914; 128/195.1
(58) Field of Search ................................. 156/230, 238, 156/247, 287, 344, 540, 343, 558, 555, 580, 562, 583.1, 584; 427/146, 147, 148, 209; 428/401, 418, 42.2, 42.3, 195.1, 200, 202, 343, 352, 914

(56) References Cited

U.S. PATENT DOCUMENTS

| | | | |
|---|---|---|---|
| 3,415,705 A | * 12/1968 | Ettre | ........................ 156/540 |
| 3,547,730 A | * 12/1970 | Cohen et al. | .......... 156/345.21 |
| 4,738,555 A | 4/1988 | Nagashima | .................. 400/240 |
| 5,370,960 A | 12/1994 | Cahill et al. | ................. 430/124 |
| 5,571,368 A | * 11/1996 | Barge | .......................... 156/359 |
| 5,582,669 A | 12/1996 | Gove et al. | ................. 156/239 |
| 5,714,305 A | 2/1998 | Teng et al. | .............. 430/271.1 |

* cited by examiner

Primary Examiner—Jerry A Lorengo (57) ABSTRACT

One embodiment is directed to a print media coating device that includes first and second web supplies, first and second web take-ups, and a fuser defining a media path therethrough. The first web supply and the first web take-up are positioned on one side of the media path and the second web supply and the second web take-up are positioned on the other side of the media path opposite the first web supply and the first web take-up. A first coating material web runs from the first web supply, along the media path through the fuser, to the first web take-up and a second coating material web runs from the second web supply, along the media path through the fuser, to the second web take-up. Another embodiment is directed to a method for coating print media that includes sandwiching the print media between two layers of coating material and then fusing the coating material to the print media.

14 Claims, 7 Drawing Sheets

PRINT MEDIA COATING DEVICE AND METHOD

FIELD OF THE INVENTION

The invention is directed to devices and methods for coating both sides of print media.

BACKGROUND

It is sometimes desirable to coat printed media with a film of clear flexible material. Such coatings can be formulated and applied to help protect the printed image, enhance the printed image, provide a more uniform gloss level across the entire media (including both printed and unprinted areas) or expand the color gamut in the printed areas. Duplex printing in which printed images are applied to both sides of a sheet of paper or other print media is now very common. Many printers, copiers, multi-function peripherals and other printing devices offer duplex printing. Where a coating is desired on both sides of a sheet, such as might be the case with duplex printing, the sheet must pass through the coating module of a post print finishing device twice—once to coat the top of the sheet and once to coat the bottom of the sheet.

SUMMARY

Various embodiments of the present invention were developed in an effort to improve on conventional techniques for coating print media on two sides. Accordingly, one embodiment of the present invention is directed to a print media coating device that includes first and second web supplies, first and second web take-ups, and a fuser defining a print media path therethrough. The first web supply and the first web take-up are positioned on one side of the media path and the second web supply and the second web take-up are positioned on the other side of the media path opposite the first web supply and the first web take-up. A first coating material web runs from the first web supply, along the media path through the fuser, to the first web take-up and a second coating material web runs from the second web supply, along the media path through the fuser, to the second web take-up.

Another embodiment of the invention is directed to a method for coating print media that includes sandwiching the print media between two layers of coating material and then fusing the coating material to the print media.

Coating print media on two sides with a single pass through a coating device helps reduce the coating time and maintain more consistent gloss levels on both sides of the media compared to dual pass devices. Some of the embodiments described also allow for the application of coatings to both sides of continuous roll-type print media that cannot pass through a coating device twice.

DETAILED DESCRIPTION

Figure 1:
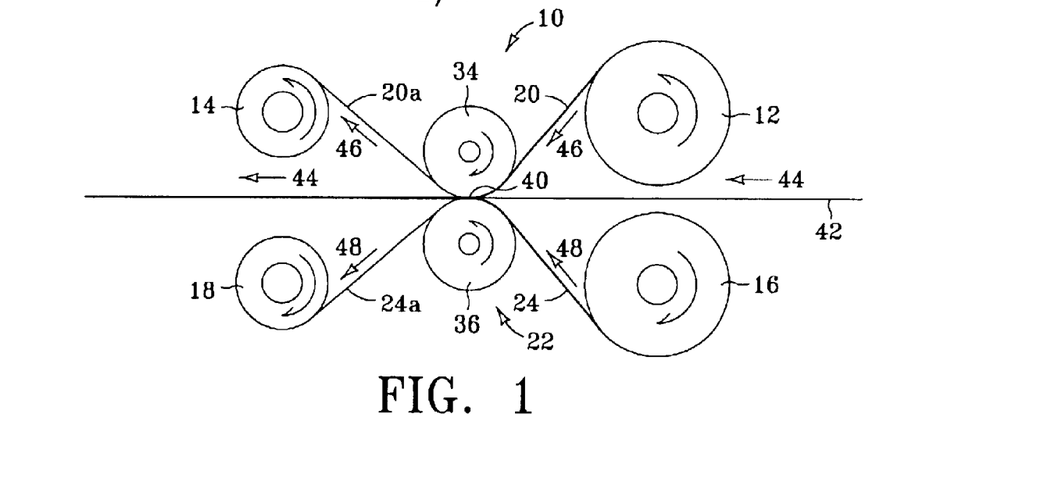
FIG. 1 illustrates a device for simultaneously coating both sides of a sheet of print media according to one embodiment of the invention.
Figure 2:
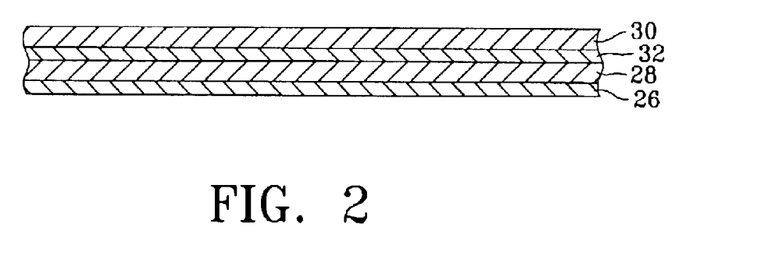
FIG. 2 illustrates a coating material web.

FIG. 1 illustrates a device for simultaneously coating both sides of a sheet of print media according to one embodiment of the invention. Referring to FIG. 1, coating device 10 includes first/top side coating material web supply and web take-up spools 12 and 14 and second/bottom side coating material supply and take-up spools 16 and 18. A first/top side coating material web 20 runs from top supply spool 12 through a fuser 22 to top take-up spool 14. A second/bottom side coating material web 24 runs from bottom web supply spool 16 through fuser 22 to bottom web take-up spool 18. Webs 20 and 24 represent generally any web that carries a coating film suitable for use with paper and other types of print media. FIG. 2 is a section view illustrating a typical web suitable for use in coating device 10. Referring to FIG. 2, web 20/24 includes a layer of adhesive material 26, a layer of coating material 28 on adhesive layer 26, a carrier 30 or backing as it is sometimes called and a release layer 32 interposed between carrier 30 and coating material 28. Suitable webs include, for example, the clear flexible film webs described in pending Hewlett-Packard patent application Ser. No. 10/167,891 filed Jun. 11, 2002 and titled "Images Printed On Porous Media And Coated With A Thermal Transfer Overcoat."

Fuser 22 represents generally any suitable device for applying heat or pressure or both to the web/media sandwich to cause coating 28 to bond to the paper or other print media. In the embodiment illustrated in FIG. 1, fuser 22 includes a pair of opposing rollers 34 and 36 that rotate against one another to form a fuser nip 40. A conventional fuser such as the roll type fuser used in a laser printer may be adapted for use as fuser 22 in coating device 10. In one example of such a fuser, which is shown in FIG. 1 and in more detail in FIG. 6, roller 34 is constructed as a heated fuser roller and roller 36 is constructed as a compliant pressure roller.

Figure 6:
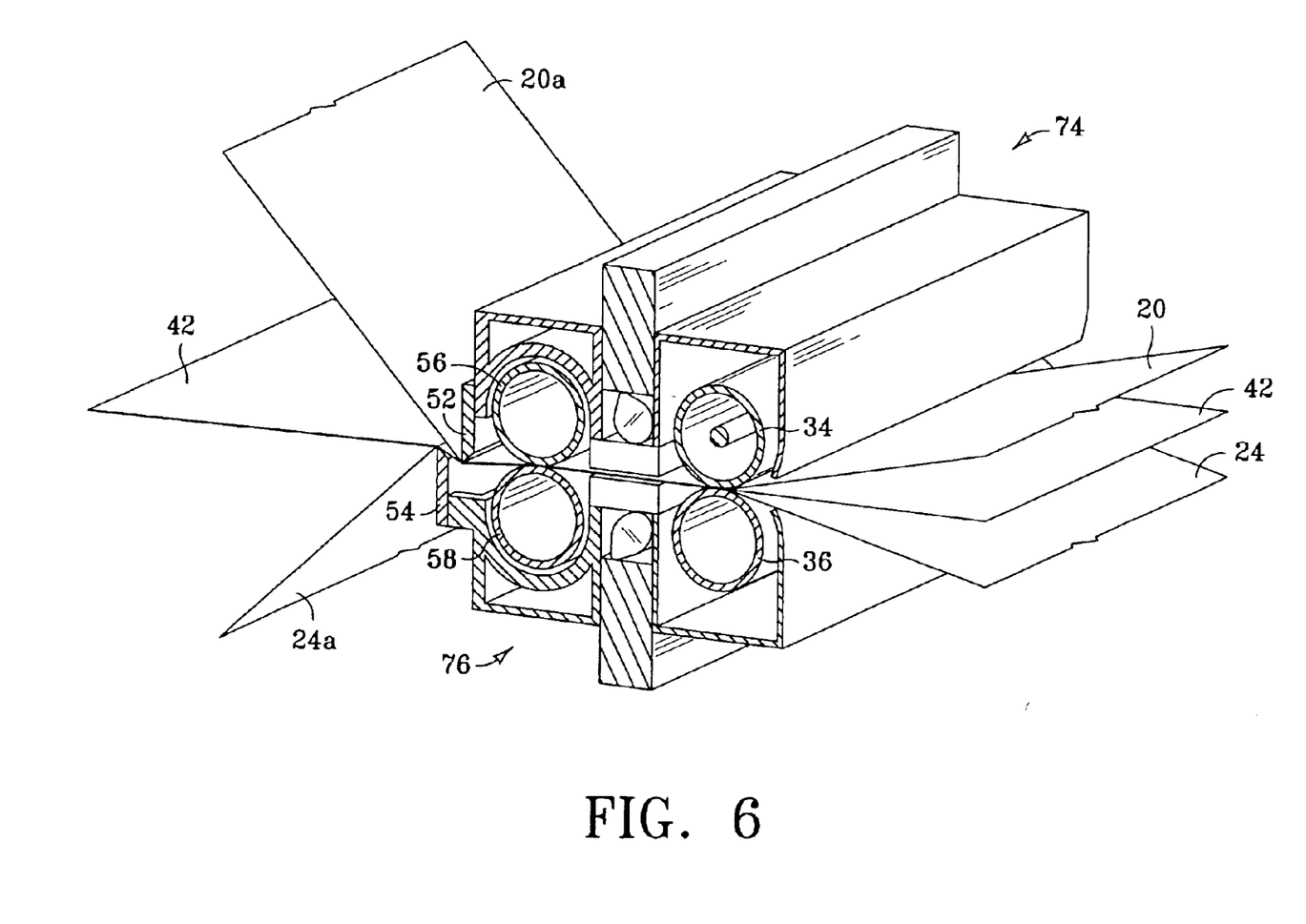
FIG. 6 illustrates the fuser and cooler module of a coating device such as the one shown in FIG. 4.
Figure 7:
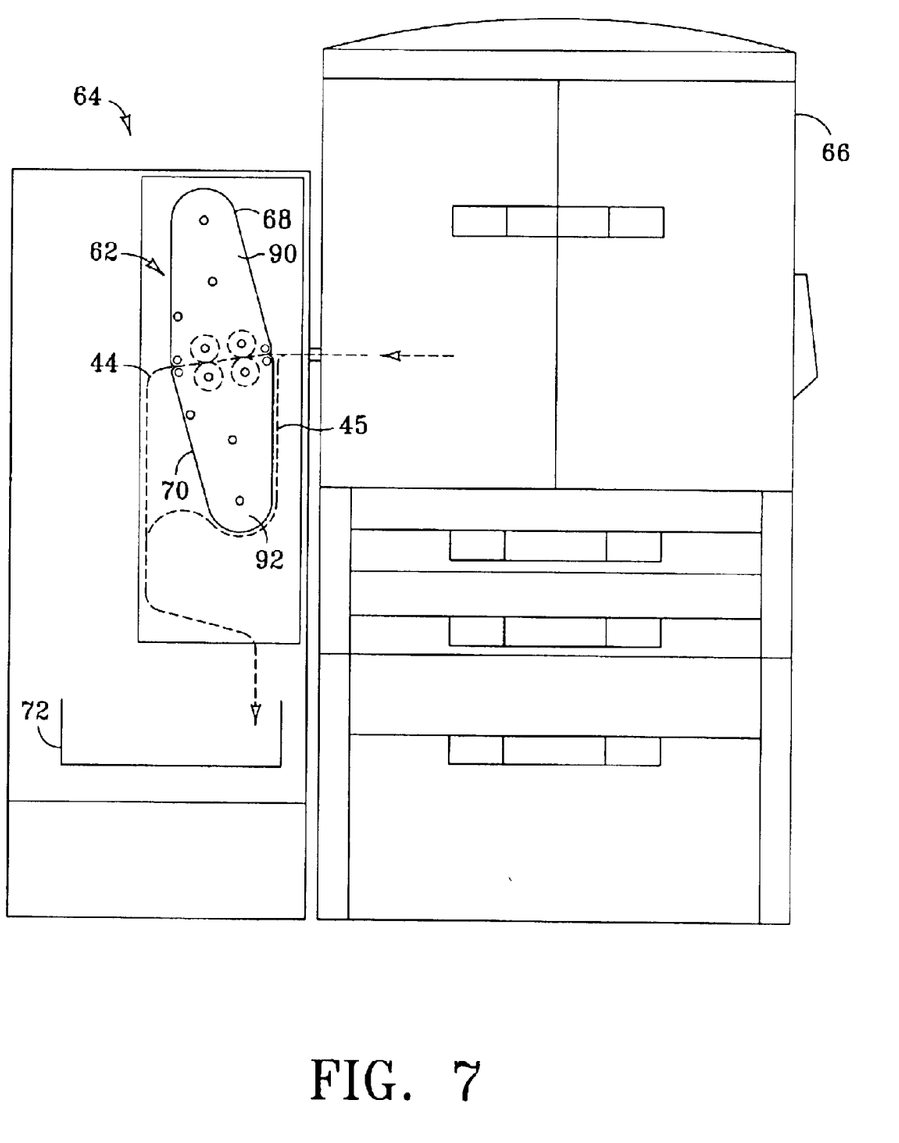
FIG. 7 illustrates a modular coating device according to one embodiment of the invention installed in a post print finishing device attached to a printer.

When a coating across the full width of the paper or other print media 42 is desired, as will typically be the case, each web 20 and 24 and the corresponding supply and take-up spools are about the same width as the print media, as best seen in FIG. 6. Print media sheet 42 moves through fuser 22 along a media path 44. Top web 20 moves from top web supply spool 12 through fuser 22 to top web take-up spool 14 along a first/top web path 46. Bottom web 24 moves from bottom web supply spool 16 through fuser 22 to bottom web take-up spool 18 along a second/bottom web path 48. Print media path 44 and web paths 46 and 48 converge at fuser nip 40, are coincident with one another through fuser 22 as coating 28 from each web is applied to the top and bottom of print media sheet 42, and then diverge as each now spent web 20a and 24a is taken up to take-up spools 14 and 18. The combination of heat and pressure applied to webs 20 and 24 and media sheet 42 as they pass through fuser nip 40 melts adhesive layers 26 into sheet 42 to bond coating 28 to the top and bottom of the sheet 42 and softens release layers 32. Spent webs 20a and 24a that are taken up on spools 14 and 18 consist of carriers 30 and the remnants of release layers 32.

Figure 3:
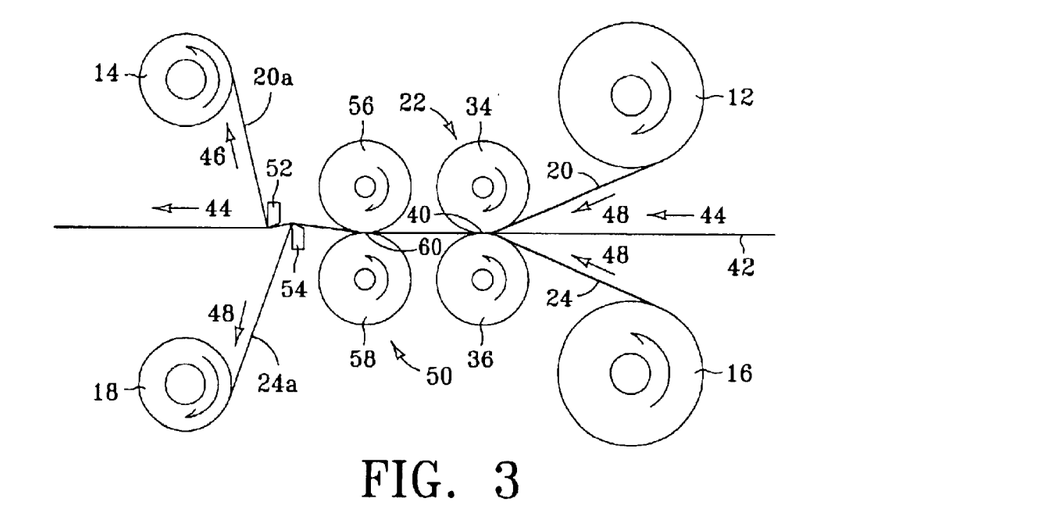
FIG. 3 illustrates a device for simultaneously coating both sides of a sheet of print media according to one embodiment of the invention in which the device includes cooling rollers and peel bars.
Figure 4:
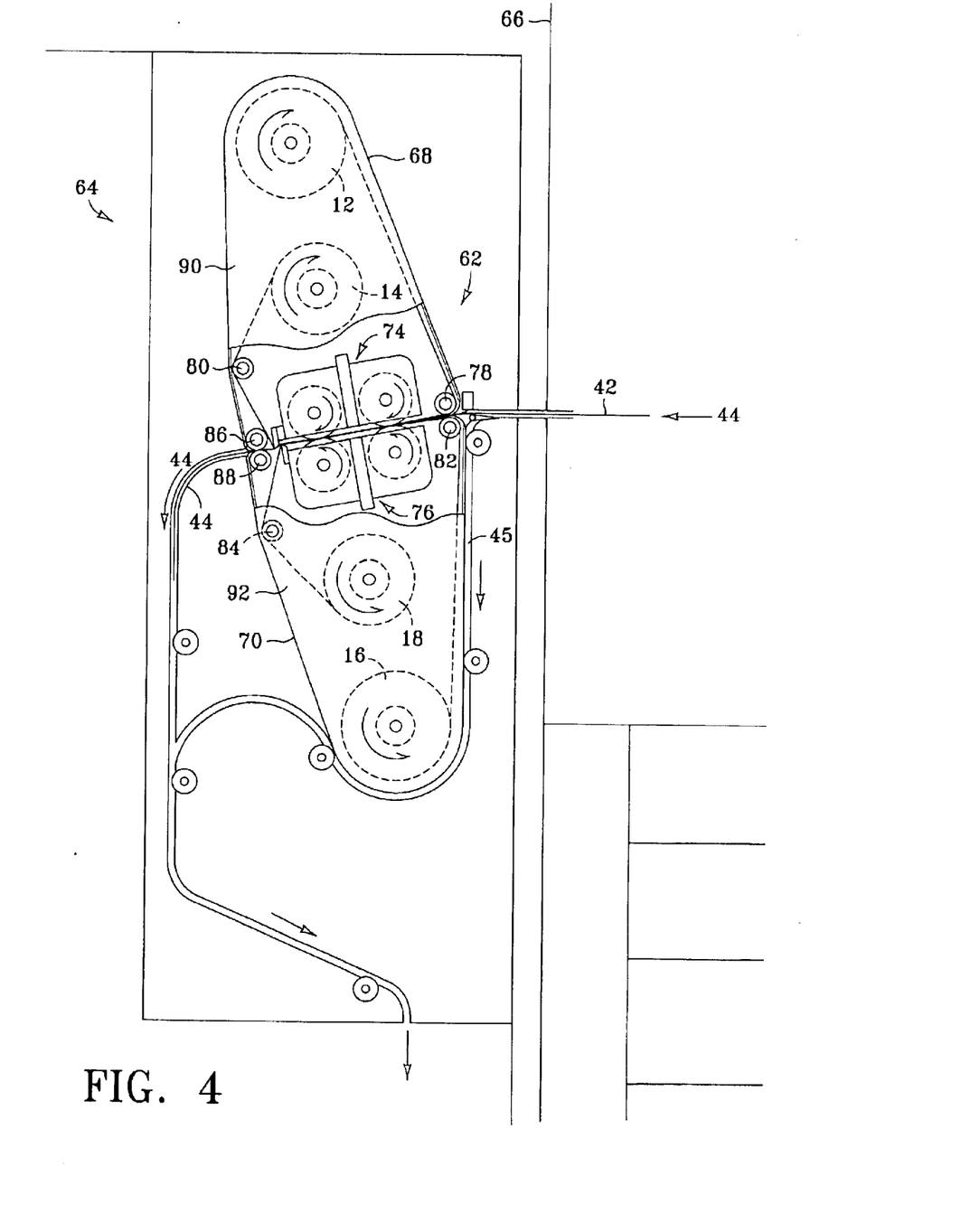
FIG. 4 illustrates a modular coating device according to one embodiment of the invention installed in a post print finishing device.

FIG. 3 illustrates a coating device 10 constructed according to a second embodiment of the invention. In this embodiment, webs 20 and 24 and sheet 42 pass through a cooler 50 downstream from fuser 22 and over peel bars 52 and 54 downstream from cooler 50. Print media path 44 and web paths 46 and 48 converge at fuser nip 40, are coincident with one another through fuser 22 and cooler 50, and then diverge at peel bars 52 and 54 as each now spent web 20a and 24a is taken up to take-up spools 14 and 18. Cooler 50 cools webs 20 and 24 and sheet 42 to accelerate curing the bond between the coating layers 28 and sheet 42. Accelerated curing strengthens the bond between coating 28 and sheet 42 and allows carrier 30 to separate more cleanly from coating 28 at peel bars 52 and 54.

In the embodiment of FIG. 3, cooler 50 is constructed as a pair of opposing rollers 56 and 58 that rotate against one another to form a cooler nip 60. Cooler 50 may cool passively as a heat sink, in which case cooler rollers 56 and 58 are constructed as a relatively large mass of thermally conductive material. Alternatively, one or both cooler rollers 56 and 58 are actively cooled so that cooler 50 actively cools the web/sheet sandwich as it passes between the cooled cooler rollers 56 and 58.

Downstream from cooler 50, each web 20, 24 passes over a peel bar 52, 54. Each peel bar 52 and 54 extends across the width of the web and protrudes slightly into the web path. Each web path 46 and 48 diverges from media path 44 at peel bars 52 and 54 at a sharp angle θ, preferably 60° to 130° and most preferably about 90°, to help carrier 30 break more cleanly away from coating layer 28.

In the embodiment of FIG. 3, peel bars 52 and 54 are not aligned directly opposite one another across the web/media path. It has been discovered that the staggered configuration shown in FIG. 3, in which one peel bar is located downstream from the other peel bar, helps improve carrier/coating separation. In an alternative configuration in which the peel bars are placed directly opposite one another, each carrier 30 is peeled away from coating layer 28 at the same time. It was discovered during testing of this alternative configuration that the adhesion between carrier 30 and coating 28 is such that each web 20 and 24 tends to pull on media sheet 42 as carrier 30 peels away from coating 28. This pull is not always the same on each side of sheet 42. One side pulling harder than the other tends to relieve pressure on the weak side peel bar. This pressure relief can impede separation between carrier 30 and coating 28 on the weak side which can, in turn, affect the quality of the coating retained on that side of sheet 42. Hence, the staggered configuration for peel bars 52 and 54 is preferred over the aligned configuration.

Figure 5:
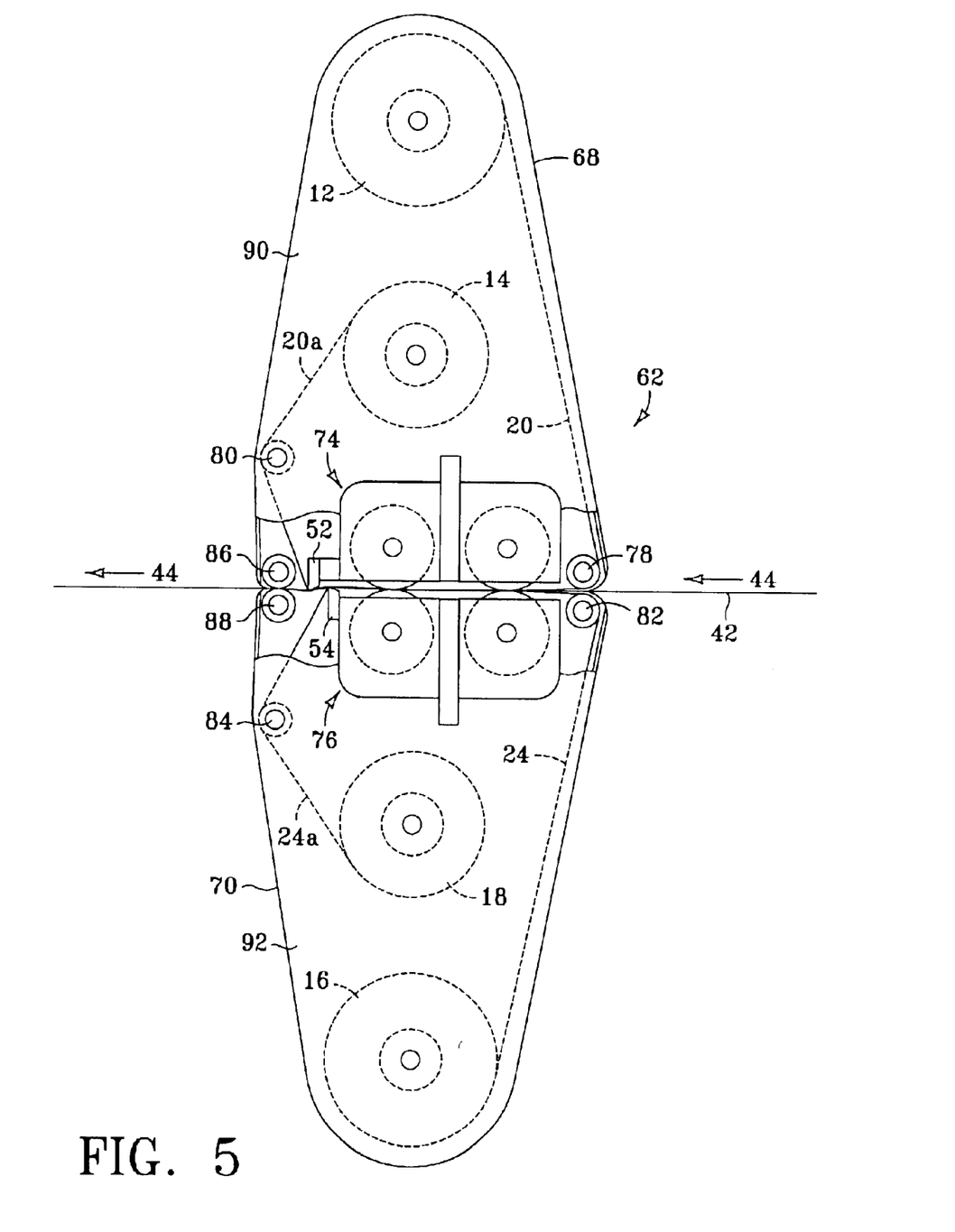
FIG. 5 is a more detailed illustration of a coating device such as the one shown in FIG. 4.

FIGS. 4–7 illustrate a modular coating device 62 installed in a post-print finishing device 64 operatively coupled to a printer 66. FIG. 5 is an enlarged view of coating device 62 and FIG. 6 is a detailed view of the fuser/cooler module 68 of coating device 62. Referring to FIGS. 4–7, modular coating device 62 includes an upper module 68 with components for coating the top of each sheet 42 and a lower module 70 with components for coating the bottom of each sheet 42. Two print media paths are provided through post print finishing device 64. A coating media path 44 runs through coating modules 68 and 70 and a bypass media path 45 bypasses coating modules 68 and 70. Both media paths 44 and 45 discharge sheets 42 to an output tray 72 (shown in FIG. 7) or to other downstream finishing operations.

Upper module 68 includes a first/top side coating material web supply spool 12, a first/top side web take-up spool 14, and a first/top side fuser and cooler unit 74. Lower module 70 includes a second/bottom side coating material web supply spool 16, a second/bottom side web take-up spool 18, and a second/bottom side fuser and cooler unit 76. First/top side coating material web 20, as shown in FIG. 5, runs from top supply spool 12 through fuser and cooler unit 74 to top take-up spool 14 around idler rollers 78 and 80. Second/bottom side coating material web 24 runs from bottom web supply spool 16 through fuser and cooler unit 76 to bottom web take-up spool 18 around idler rollers 82 and 84. Top supply and take-up spools 12, 14 and bottom supply and take-up spools 16,18 are positioned over one another to achieve a vertically compact design.

Figure 8:
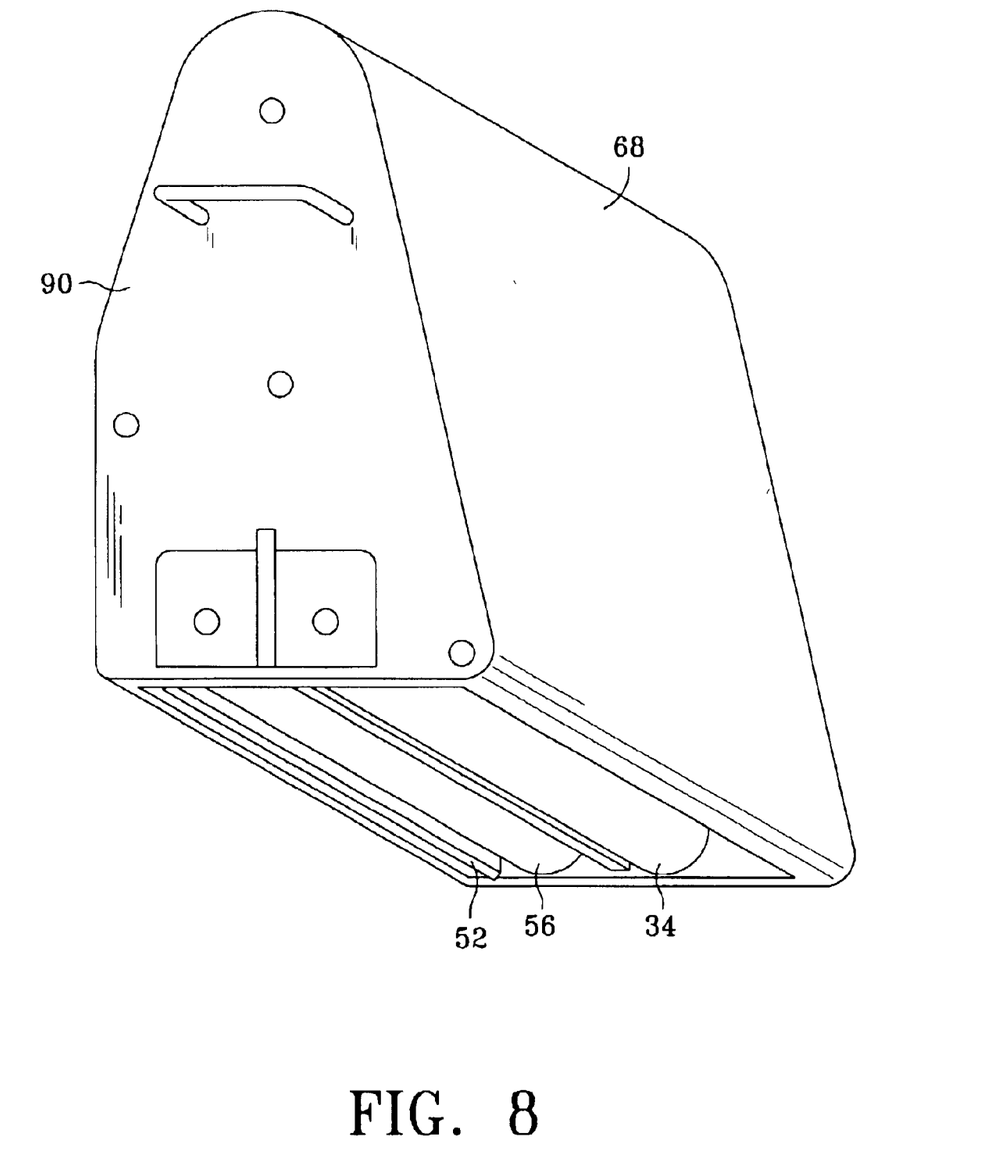
FIG. 8 is a perspective view of an upper/top side coating module according to one embodiment of the invention.

An exit drive roller 86 and associated pinch roller 88 propel media sheets 42 out of coating device 62 toward output tray 72. Each of the rollers in upper coating module 68 are mounted to or otherwise supported by an upper module frame 90. Each of the rollers in lower coating module 70 are mounted to or otherwise supported by a lower module frame 92. FIG. 8 is a perspective view of upper module 68. Module 68 and its counterpart lower module 70 are configured to slide into and out of post print finishing device 64 to facilitate installation, repair and replacement of the module.

The various components of coating device 62 may be directly supported by the frame, such as by mounting a component directly to the frame, or components may be indirectly supported by the frame, such as by mounting a component to a support structure or other component that is mounted to the frame. The frame that supports the components may be a module frame, as in upper module frame 90 and lower module frame 92, an overall coating device frame, or the post print finishing device frame such as might be the case where the coating device is not constructed of modular units that slide into and out of the finishing device.

Figure 9:
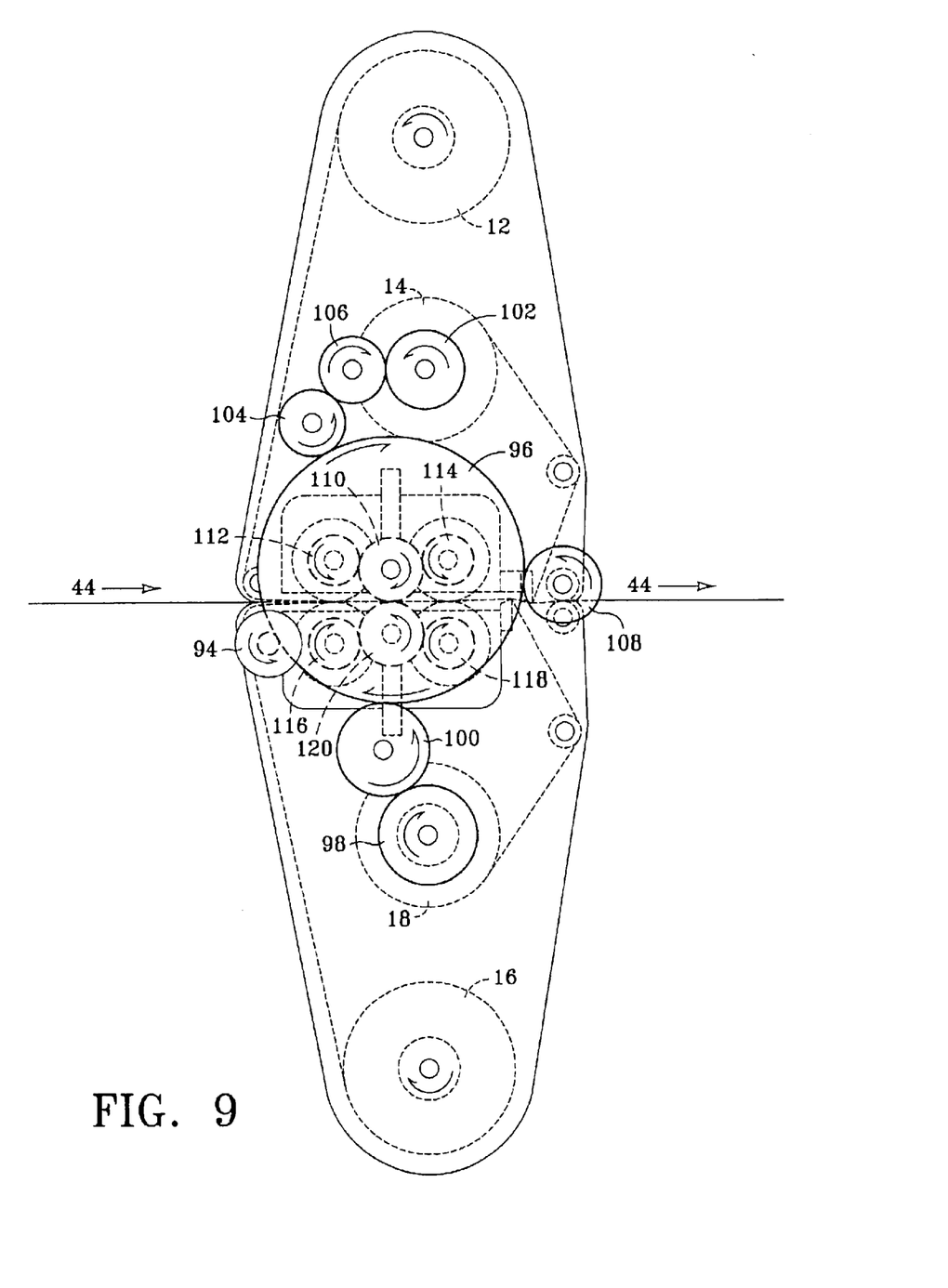
FIG. 9 illustrates a drive train for the driven components of a modular coating device according to one embodiment of the invention.

FIG. 9 illustrates a drive train for driven components of modular coating device 62. In the drive train shown in FIG. 9, all of the major components in media path 44 and web paths 46 and 48 are driven by one motor. Other drive train configurations are possible and two or more motors could be used to drive the various components. Referring to FIG. 9, main drive stepper motor 94 drives main drive gear 96 clockwise. Bottom web take-up gear 98, which is coupled to bottom web take-up spool 18, is driven clockwise off main gear 96 through a spacer gear 100. Top web take-up gear 102, which is coupled to top web take-up spool 14, is driven counter-clockwise off main gear 96 through a pair of reversing spacer gears 104 and 106. Exit drive gear 108, which is coupled to exit drive roller 86, is driven counter-clockwise directly off main gear 96.

Center drive gear 110, which turns coaxially with main gear 96, is driven clockwise at the urging of motor 94. Top fuser roller gear 112, which is coupled to top fuser roller 34, and top cooler roller gear 114, which is coupled to top cooler roller 56, are driven counter-clockwise off center drive gear 110. Bottom fuser roller gear 116, which is coupled to bottom fuser roller 36, and bottom cooler roller gear 118, which is coupled to bottom cooler roller 58, are driven clockwise off center drive gear 110 through a center spacer gear 120.

Although not shown, the drive train illustrated in FIG. 9 may also include clutches interposed between some of the drive elements as necessary or desirable to maintain the appropriate relationship among moving parts. For example, electro-magnetic slip clutches should be included at take-up gears 98 and 102 to help control the tension on top and bottom coating webs 20, 20a and 24, 24a.

While the present invention has been shown and described with reference to the foregoing exemplary embodiments, it is to be understood that other forms, details, and embodiments may be made without departing from the spirit and scope of the invention which is defined in the following claims.

What is claimed is:

1. A print media coating device, comprising:
   a first web supply;
   a first web take-up;
   a second web supply;
   a second web take-up;
   a fuser defining a media path therethrough;
   the first web supply and the first web take-up positioned on one side of the media path and the second web supply and the second web take-up positioned on another side of the media path opposite the first web supply and the first web take-up and the first web supply, the first web take-up, the second web supply and the second web take-up generally alligned with one another along a line that is substantially perpendicular to the media path;
   a first coating material web running from the first web supply, along the media path through the fuser, to the first web take-up; and
   a second coating material web running from the second web supply, along the media path through the fuser, to the second web take-up.

2. The device of claim 1, further comprising a web cooler defining a continuation of the media path therethrough down stream from the fuser, the first and second coating material webs running from the corresponding web supply, along the media path through the fuser and the cooler, to the corresponding web take-up.

3. The device of claim 1, wherein the fuser comprises a pair of rollers engagable with one another to form a fuser nip and the fuser nip defines the media path through the fuser.

4. The device of claim 2, wherein the cooler comprises a pair of rollers engagable with one another to form a cooler nip, the cooler nip defining the media path through the cooler and at least one of the rollers being cooled.

5. A print media coating device, comprising:
   a frame;
   a first web supply spool rotatably supported by the frame proximate a first side of a media path;
   a first web take-up spool rotatably supported by the frame proximate the first side of the media path downstream from the first web supply spool along a first web path that begins at the first supply spool and ends at the first take-up spool;
   the first web supply spool and the first web take-up spool positioned one over the other above the media path;
   a second web supply spool rotatably supported by the frame proximate a second side of a media path opposite the first side;
   a second web take-up spool rotatably supported by the frame proximate the second side of the media path downstream from the second web supply spool along a second web path that begins at the second supply spool and ends at the second take-up spool;
   the second web supply spool and the second web take-up spool positioned one over the other below the media path;
   a fuser supported by the frame, the fuser disposed along the media path, along the first web path between the first supply spool and the first take-up spool, and along the second web path between the second supply spool and the second take-up spool;
   a motor drivingly coupled to the first web take-up spool and the second web take-up spool; and
   the media path, the first web path and the second web path coincident with one another through the fuser.

6. The device of claim 5, further comprising a first coating material web on the first web supply spool and a second coating material web on the second web supply spool, each web having a layer of coating material and a carrier carrying the layer of coating material.

7. The device of claim 5, further comprising a coating material web running from each of the web supply spools along each web path to the corresponding web take-up spool, each coating material web having a first portion upstream from the fuser that includes a layer of coating material and a second spent portion downstream from the fuser from which substantially all of the coating material has been removed.

8. The device of claim 5, wherein the motor comprises a single motor.

9. The device of claim 5, further comprising:
   a first peel bar supported by the frame, the first peel bar disposed along the media path downstream from the fuser and the first peel bar protruding into the first web path;
   a second peel bar supported by the frame, the second peel bar disposed along the media path downstream from the fuser and the second peel bar protruding into the second web path; and
   the media path, the first web path and the second web path coincident with one another from the fuser to at least one of the peel bars.

10. The device of claim 5, further comprising:
    a first peel bar supported by the frame, the first peel bar disposed along the media path downstream from the fuser;
    a second peel bar supported by the frame, the second peel bar disposed along the media path downstream from the fuser opposite the first peel bar; and
    the media path, the first web path and the second web path coincident with one another from the fuser to the peel bars.

11. The device of claim 9, wherein the media path, the first web path and the second web path converge into the fuser and diverge from the peel bars.

12. A print media coating device, comprising:
    a first rotatable web supply spool proximate a first side of a media path;
    a first rotatable web take-up spool proximate the first side of the media path downstream from the first web supply spool along a first web path that begins at the first supply spool and ends at the first take-up spool;
    a second rotatable web supply spool proximate a second side of the media path opposite the first side;
    a second rotatable web take-up spool proximate the second side of the media path downstream from the second web supply spool along a second web path that begins at the second supply spool and ends at the second take-up spool;
    the first web supply spool, the first web take-up spool, the second web supply spool and the second web take-up spool generally alligned with one another along a line that is substantially perpendicular to the media path;

a fuser along the first web path between the first supply spool and the first take-up spool and along the second web path between the second supply spool and the second take-up spool, the fuser comprising first and second rollers engagable with one another to form a fuser nip and the fuser nip defining the media path through the fuser;

a single motor drivingly coupled to the first web take-up spool, the second web take-up spool and at least one of the fuser rollers; and the media path, the first web path and the second web path coincident with one another through the fuser.

13. A print media coating device, comprising:

a first rotatable web supply proximate a first side of a media path;

a first rotatable web take-up spool proximate the first side of the media path downstream from the first web supply spool along a first web path that begins at the first supply spool and ends at the first take-up spool;

a second rotatable web supply spool proximate a second side of the media path opposite the first side;

a second rotatable web take-up spool proximate the second side of the media path downstream from the second web supply along a second web path that begins at the second supply spool and ends at the second take-up spool;

a fuser along the first web oath between the first supply spool and the first take-up spool and alone the second web oath between the second supply spool and the second take-up spool, the fuser comprising first and second rollers engagable with one another to form a fuser nip and the fuser nip defining the media path through the fuser;

a single motor driving coupled to the first web take-up spool, the second web take-up spool and at least one of the fuser rollers;

the media path, the first web path and the second web path coincident with one another through the fuser;

a main drive gear drivingly coupled directly to the motor;

a center drive gear mounted coaxially with the main drive gear;

second web take-up spacer gear engaging the main drive gear;

a second web take-up gear coupled to the second web take-up spool, the second web take-up gear engaging the second web take-up spacer gear;

a first web take-up gear coupled to the first web take-up spool;

first and second reversing spacer gears engaging one another, the first reversing spacer gear engaging the main drive gear and the second reversing spacer gear engaging the first web take-up gear;

a first fuser gear coupled to the first fuser roller, the first fuser gear engaging the center drive gear;

a fuser spacer gear engaging the center drive gear; and a second fuser gear coupled to the second fuser roller, the second fuser gear engaging the fuser spacer gear.

14. The device of claim 1, wherein the first web supply and the first web take-up are positioned one over the other on one side of the media path and the second web supply and the second web take-up are positioned one over the other an another side of the media path.

* * * * *

UNITED STATES PATENT AND TRADEMARK OFFICE
CERTIFICATE OF CORRECTION

PATENT NO. : 6,823,920 B2
DATED : November 30, 2004
INVENTOR(S) : Maximo Gayoso

It is certified that error appears in the above-identified patent and that said Letters Patent is hereby corrected as shown below:

Title page,
Item [54], Title, delete "PRINT MEDIA COATING DEVICE AND METHOD" and insert therefor -- PRINT MEDIA COATING DEVICE --.

Column 7,
Line 18, after "supply" insert -- spool --.
Lines 32 and 34, delete "oath" and insert therefor -- path --.
Line 33, delete "alone" and insert therefor -- along --.

Column 8,
Line 3, delete "driving" and insert therefor -- drivingly --.
Line 33, delete "an" and insert therefor -- on --.

Signed and Sealed this

Thirtieth Day of August, 2005

JON W. DUDAS
*Director of the United States Patent and Trademark Office*